(12) United States Patent
Campau

(10) Patent No.: US 7,029,786 B2
(45) Date of Patent: Apr. 18, 2006

(54) SINGLE POINT WATERING APPARATUS FOR LEAD-ACID BATTERY

(75) Inventor: Daniel N. Campau, Ada, MI (US)

(73) Assignee: Flow-Rite Controls, Ltd., Byron Center, MI (US)

( * ) Notice: Subject to any disclaimer, the term of this patent is extended or adjusted under 35 U.S.C. 154(b) by 275 days.

(21) Appl. No.: 10/367,630

(22) Filed: Feb. 14, 2003

(65) Prior Publication Data

US 2004/0161661 A1 Aug. 19, 2004

(51) Int. Cl.
*H01M 2/36* (2006.01)
*H01M 2/12* (2006.01)

(52) U.S. Cl. .............................. 429/64; 429/72; 429/74; 429/80; 429/86; 137/260

(58) Field of Classification Search ................. 429/64, 429/72, 73, 74, 75, 76, 77, 78, 79, 80, 86; 137/260; 285/129.1, 130.1
See application file for complete search history.

(56) References Cited

U.S. PATENT DOCUMENTS

| | | | | |
|---|---|---|---|---|
| 1,471,362 A | * | 10/1923 | Sartakoff | 429/79 X |
| 3,561,505 A | * | 2/1971 | Ryder | 429/77 X |
| 3,879,227 A | * | 4/1975 | Hennen | 429/86 |
| 4,087,592 A | * | 5/1978 | Okazaki et al. | 429/78 X |
| 5,298,344 A | * | 3/1994 | Stocchiero | 429/86 X |
| 5,832,946 A | * | 11/1998 | Campau | 429/64 X |
| 6,120,929 A | * | 9/2000 | Stocchiero | 429/76 X |
| 6,227,229 B1 | * | 5/2001 | Campau | 137/260 |

* cited by examiner

*Primary Examiner*—Stephen J. Kalafut
(74) *Attorney, Agent, or Firm*—Niro, Scavone, Haller & Niro

(57) ABSTRACT

The present invention is directed to a single point watering system for use with a lead-acid battery having a plurality of battery cell access ports. The system comprises a plurality of refill valves and a plurality of refill valves and a manifold having (i) a water feed tube with at least one external port and a plurality of outlets each communicating with one of the plurality of refill valves, and (ii) at least one passageway housing a flame arrestor to permit the discharge of gases from the battery cells to the surrounding environment only through the flame arrestor. The manifold is removably and sealably mountable to the battery so that each refill valve is in fluid communication with one of the battery cell access ports.

11 Claims, 5 Drawing Sheets

SINGLE POINT WATERING APPARATUS FOR LEAD-ACID BATTERY

BACKGROUND OF THE INVENTION

The present invention relates generally to single point watering (SPW) systems. More particularly, the invention relates to an improved SPW system specially adapted for use with a particular class or style of lead-acid battery known in the art as a "deep cycle" battery.

Deep cycle batteries, widely used in boats and RVs, are ideal candidates for SPW maintenance. These batteries are commonly used to provide boats and RVs with "house power" for various accessories, including trolling motors, pumps, lighting and instruments. Deep cycle batteries are special 6 cell (12 volt) monoblocs, based on flooded, lead-acid technology, distinct from gel cell or absorbed glass mat technologies. Many boaters and RV owners prefer the flooded cell batteries to the alternatives. They have lower initial cost; they produce more amp hours of energy per pound; they use lower cost chargers; and they are more tolerant of overcharging. However, water is lost from the electrolyte in these batteries due to evaporation and electrolysis, and must be replaced periodically. As a result, a significant disadvantage of flooded cell batteries is that they require regular watering to maintain performance. This can be a significant problem. Batteries are frequently mounted in locations difficult to access, such as the bilge of a boat, or in small compartments that make it difficult to accurately add water manually. As a result, they often do not receive the regular watering they require, which can shorten batter life and weaken performance. If a practical SPW system were available for this class of batteries, it would prove valuable to a large number of boaters and RV owners.

Installing an SPW system on a deep cycle battery has heretofore been considered impractical. Cells are very closely spaced, and the battery cell vent openings are small in diameter, making individual SPW refill valves, designed for industrial use, too big and bulky to mount in deep cycle battery cells. With a cell spacing of 1 5/8 in., there is not enough room to connect tubing to individual refill valves, even if they could fit into the small vent openings. In addition, multiple batteries are often used, with separate mounting arrangements and locations, making installation of an SPW system even more difficult, where control of water supply pressure, or residual water in the tubing could cause problems such as overfilling. A practical SPW system for this application would have to function reliably, independent of battery location and free of tightly controlled water supply pressure. Ideally, the vehicle operator could fill the batteries from a remote location, for example, in a boat while standing on the deck. The water should be supplied directly from a portable bottle of distilled water, or an easily accessed container of distilled water stored on the vehicle. Users will have a choice of water supply systems, such as a gravity fill or a small hand pump for a direct fill from a distilled water container, or a built-in electric pump, such as an inexpensive centrifugal pump, to provide push button battery watering.

What is needed, therefore, is an SPW system adapted particularly for use with the marine deep cycle class of lead-acid batteries.

SUMMARY OF THE INVENTION

The present invention is directed to a single point watering system for use with a lead-acid battery having a plurality of battery cell access ports. The system comprises a plurality of refill valves and a plurality of refill valves and a manifold having (i) a water feed tube with at least one external port and a plurality of outlets each communicating with one of the plurality of refill valves, and (ii) at least one passageway housing a flame arrestor to permit the discharge of gases from the battery cells to the surrounding environment only through the flame arrestor. The manifold is removably and sealably mountable to the battery so that each refill valve is in fluid communication with one of the battery cell access ports.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENTS

Figure 1:
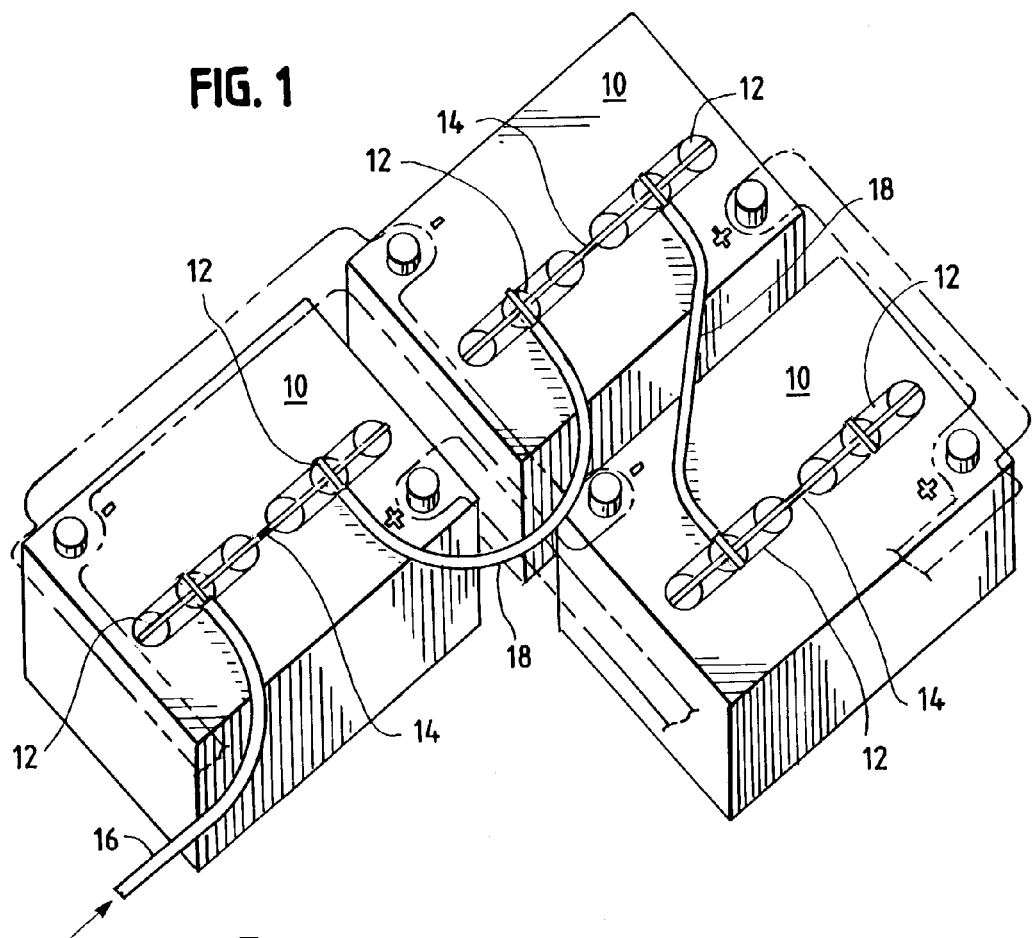
FIG. 1 is a top perspective view showing an array of deep cycle batteries having an SPW system installation in accordance with the present invention.
Figure 2:
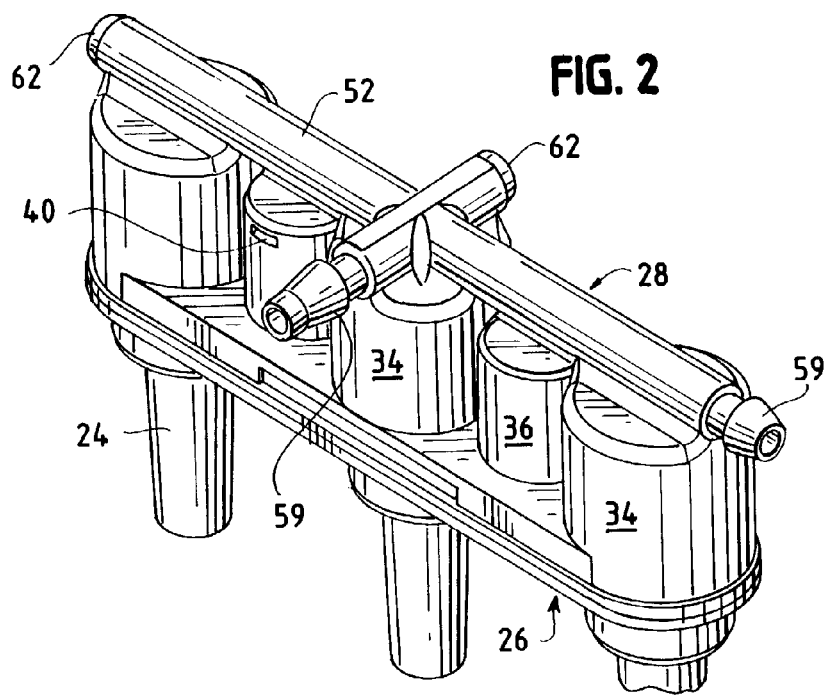
FIG. 2 is a perspective view of one preferred embodiment showing refill valves assembled with a manifold useful in the practice of the present invention.
Figure 3:
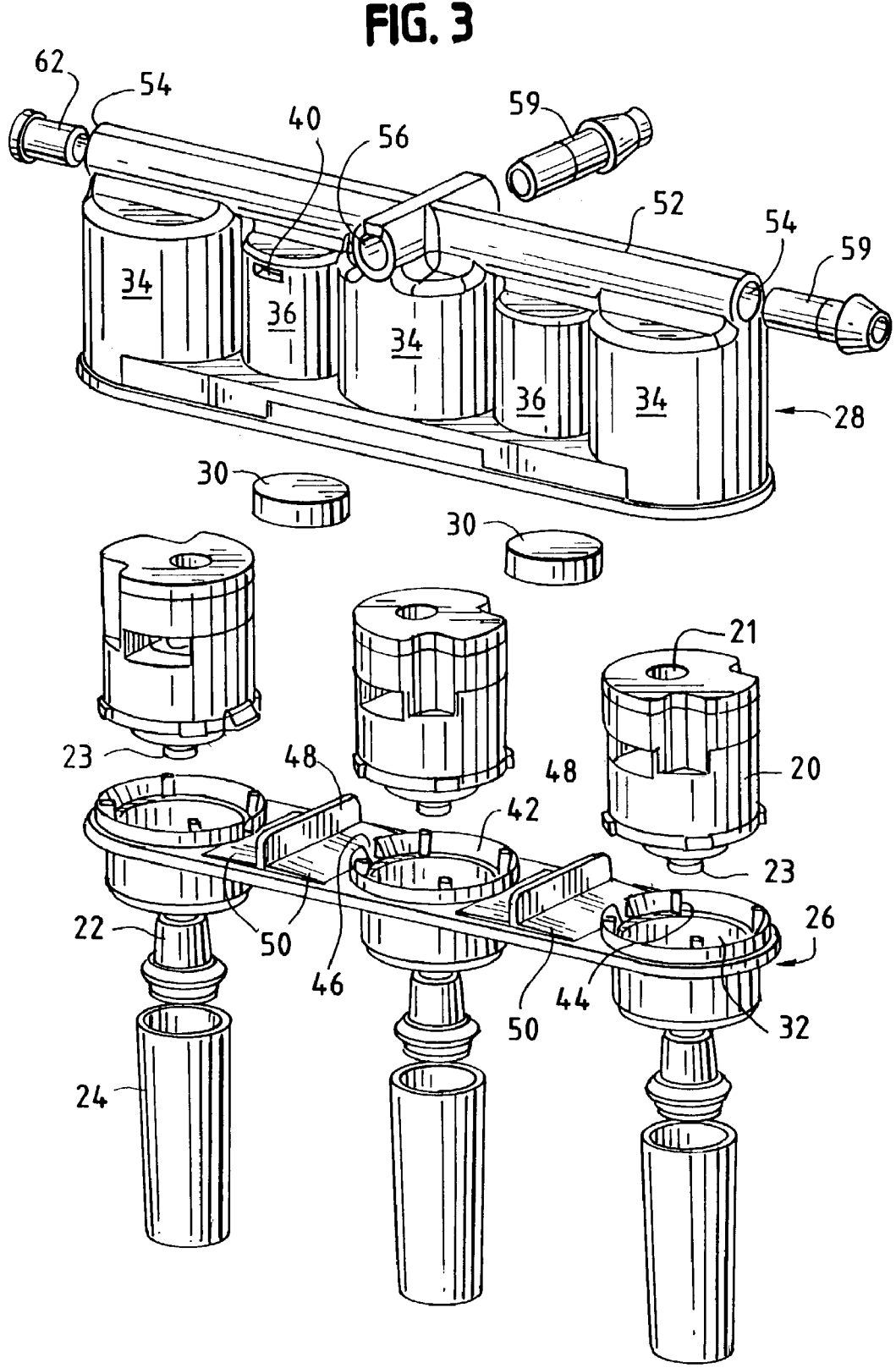
FIG. 3 is an exploded perspective view of the valve and manifold assembly of FIG. 2.
Figure 4:
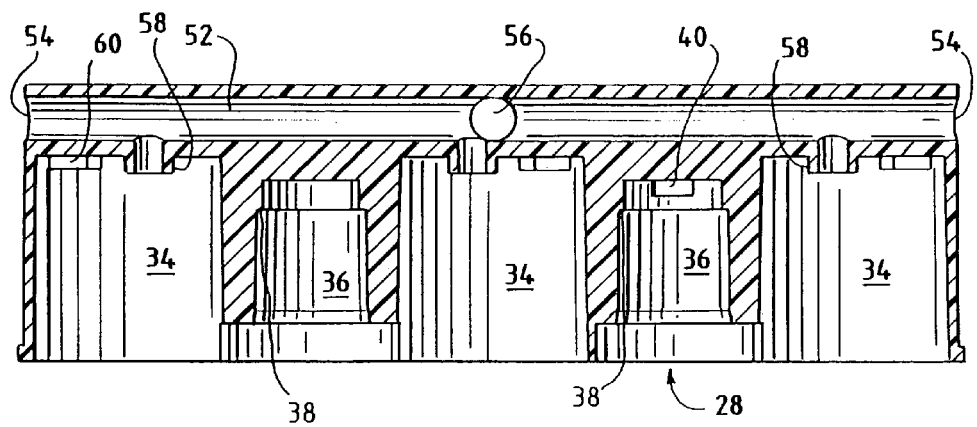
FIGS. 4 and 5 are cross-sectional views of the cover and base, respectively, of the manifold made in accordance with a preferred embodiment of the present invention.
Figure 5:
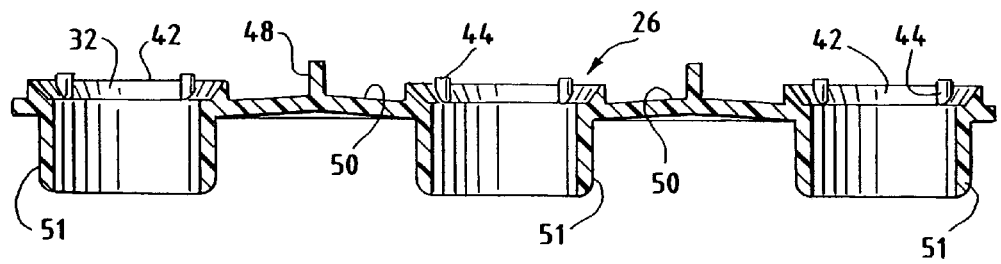

I have found that the battery refill valve disclosed in U.S. Pat. No. 6,227,229 can be readily modified to provide a practical marine deep cycle battery SPW system. The entire disclosure of U.S. Pat. No. 6,227,229 is hereby incorporated by reference. This valve controls the flow of water into a battery cell by means of a displacer responsive to liquid level in the cell. This valve is unique in the SPW field in that it is sensitive to a very small displacement force over a wide range of operating water supply pressures. This enables the valve to be controlled by a small displacer which can fit into the small vent opening common to the marine deep cycle battery, and still allow a wide range of water supply pressures to be used. A wide range of input water operating pressure is important to provide a wide range of water supply options.

The term "deep cycle battery" as used herein refers to a special configuration of monobloc battery. They are 12 volt (six cell) monobloc batteries that are within the standard battery size designations: Group 24, Group 27 and Group 31. These batteries have certain similarities in the size and location of their cell vent port openings. Batteries in each of the Groups 24, 27 and 31 all have cell vent port openings of a nominal 3/4 inch diameter. Also, the six openings in each battery share a common centerline and are grouped into two subsets of three cells each. The openings within the gangs of three are spaced a nominal 1 5/8 inch apart. The two subsets are spaced differently between the Group 24, 27 and 31 size batteries. Typically, in deep cycle batteries, each cell vent port opening is designed to receive a venting cap which press fits into the opening. Normally these caps are ganged together in a single integral structure of three. The closure assembly includes a common passageway for cell gases to vent to atmosphere. Each battery has two closure/vent assemblies, each one press fit into three cell openings. The closures are spaced together most closely on the Group 24 size batteries and farthest apart on the Group 31 size batteries.

As described below in accordance with the preferred embodiment, three automatic shut-off refill valves are housed in a structure which replaces the normal closure used on Group 24, 27 and 31 batteries. Two manifolds per battery are therefore required. They are joined together on each battery by a short section of tubing of length appropriate for the particular Group.

In the preferred embodiments described below, the normal cap or closure assembly is replaced by a valve-manifold assembly. The manifold sits above the battery cover with the valve body of each refill valve housed within. The manifold must provide a path for water to flow into the cell during the refill cycle and for the gases to leave the cells and vent to atmosphere whenever the gas pressure exceeds ambient (atmospheric pressure). The manifold must also seal the cell opening so that electrolyte does not leak onto the battery top due to tilting and sloshing. The manifold must also allow the valve displacer to communicate with the electrolyte and the valve to control the electrolyte level. The manifold therefore includes three bosses which extend from the bottom of the manifold to press fit into the cell vent port openings to provide and maintain a tight seal and attachment under normal shock, vibration and handling loads. Each boss on the manifold has an inside diameter sufficient to allow a displacer to communicate with the valve body in the manifold and the electrolyte within the cell, as well as space for water to flow into the cell and gasses to flow from the cell into the manifold.

FIG. 1 illustrates an array of three deep cycle batteries 10, each having six battery cell access ports arranged linearly across the top of the battery. This set of six ports is, as described above, two subsets of three ports arranged end to end. While the spacing between the access ports in the subsets is uniform throughout the marine deep cycle battery class (at 1 5/8 in.), the spacing between the two port subsets may vary (typically from 1 5/8 in. to 2 7/8 in.). As a result, each battery 10 is provided with two separate valve-manifold assemblies 12, which are joined by intra battery connecting tubes 14. The SPW system also includes a water supply tube 16 and inter battery connecting tubes 18. Further, structural details of the valve-manifold assembly 12 are illustrated in FIGS. 2–5. The valve includes a valve body or cartridge 20 with an inlet 21 and valve stem 23, and an acuator comprising displacer top 22 and displacer bottom 24. The manifold includes a base 26 and cover 28. A pair of flame arrestors 30, in the form of porous plastic disks, are also part of the assembly.

The details of valve cartridge 20 and displacer 22, 24 are more fully disclosed in U.S. Pat. No. 6,227,229 which is incorporated herein by reference. The individual valve cartridges 20 each are positional in an enclosure in the manifold defined by cartridge well 32 in the base 26 and a cartridge canister 34 in the cover 28. The flame arrestors 30 are press fit into passageways or arrestor receptacles 36 where they abut shoulder 38 at a level just below gas vent ports 40.

The manifold base 26 is provided with upstanding annular flanges 42, each of which defines an individual valve cartridge well 32. A plurality of spacers or small pins 44 are formed in the base 26, preferably along the inside perimeter of flanges 42, and a plurality of openings or slots 46 are formed in flanges 42, as well. The pins 44 support the cartridges 20 in spaced relation from base 26 so that, in combination with slots 46, passageways are provided for the flow of water from the refill valves into the battery cells and the flow of gases from the battery cells into receptacles 34. The gases collecting in receptacles 34 then pass through the flame arrestors 30 and out of the manifold through vent ports 40.

Base 26 is also provided with baffles 48 and sloping surfaces 50. Thus, any water from a valve cartridge 20 or electrolyte from the battery cell that finds its way into gas receptacles 34 is easily redirected back into the battery cells.

Finally, base 26 is also provided with a plurality of manifold skirts or bosses 51 which are sized and positioned for press fit insertion into the battery cell access ports. In this manner, the valve-manifold assembly is sealably mounted to the battery with each of the refill valves' displacers positioned within one of the battery cells. Water is, therefore, delivered to the battery cells via the valve-manifold assemblies 12 and gases developing in and/or displaced from the cells are discharged to the surrounding environment through the valve-manifold assemblies 12, as well.

Manifold cover 28 includes a longitudinally extending water feed tube 52 having four external ports, preferably two end ports 54 and two intermediate ports 56. Bosses 58 extend from feed tube 52 into each valve cartridge canister 34 forming internal ports 58 for the delivery of water to each valve cartridge 20. The internal size and configuration of the cartridge canisters 34 together with the bosses 58 are adapted to receive the individual valve cartridges 20 in press fit relationship to form a leak tight seal at the cartridge inlet 21. The manifold cover 28 also preferably includes one or more projecting keys 60 which assure the proper orientation of the valve cartridges 20 in canisters 34.

After the valve cartridges 20 and flame arrestors 30 are properly positioned within manifold cover 28, the base 26 is ultrasonically welded or otherwise joined in a leak tight manner to the cover, and the displacer top 22 and bottom 24 are snap fit onto the valve cartridge stem 23. At this point, the valve-manifold assembly is complete and it may be easily mounted to the top of a deep cycle battery 10.

To finish the SPW system installation, the remaining access ports on the battery 10, and on any other batteries in the array, are also fitted with a valve-manifold assembly 12, and intra battery tubes 14 and inter battery tubes 18, along with a water supply tube 16 are fitted onto the various external ports 54 and 56, as needed. A barbed fitting or extension 59 may be conveniently employed for connecting tubes 14, 16 and 18 to the manifold. All unused external ports are fitted with plugs 62, and the entire SPW installation is complete. By using single barb connectors, as illustrated, and using flexible ¼ in. I.D. PVC tubing, the connections are effected simply by sliding the end of the tubes over the barb connectors, and no clamps or wire ties are required. This, too, simplifies the installation and reduces the entire associated costs.

Figure 6:
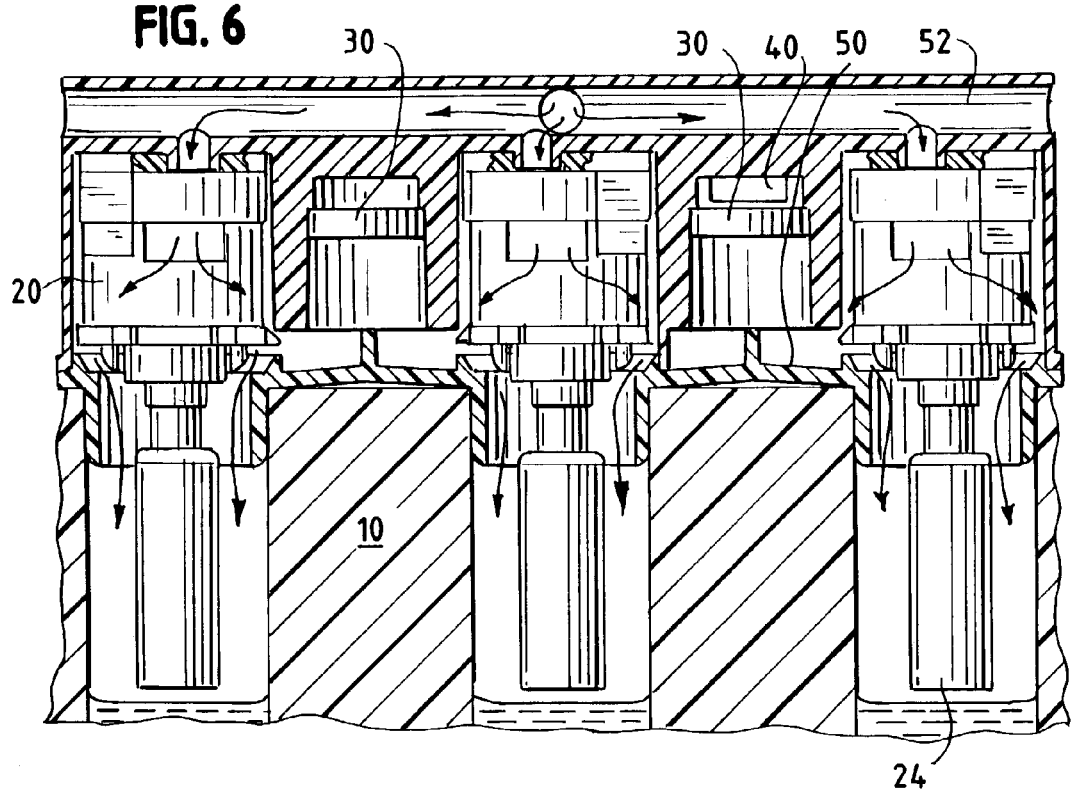
FIGS. 6 and 7 are cross-sectional views showing further details of the valve and manifold assembly as installed on a marine deep cycle battery at the beginning and end of the watering cycle.
Figure 7:
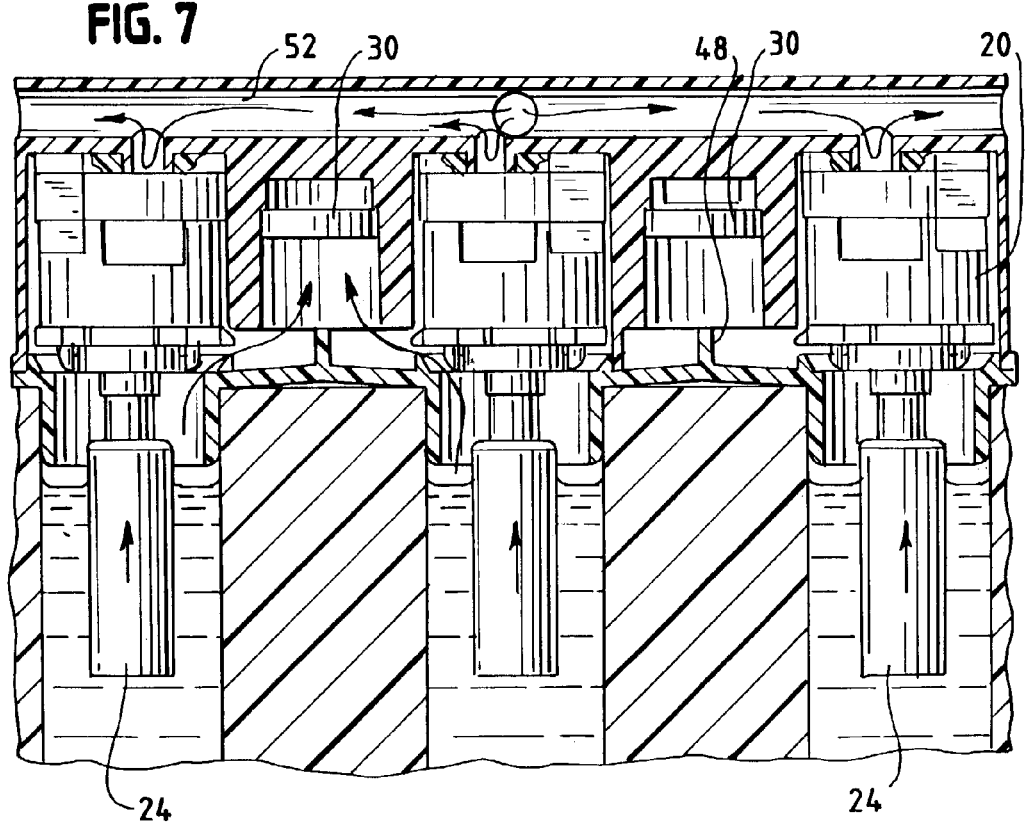

As illustrated in FIGS. 6 and 7, during the water filling cycle the displacers 24 are low and water from the feed tube 52, passes through valve cartridge 20 and into the battery cell. At the same time, gases displaced from the cells enter gas receptacles 34 and pass out of the manifold through arrestors 30 and vent ports 40. When the displacers rise, the refill valves automatically close as the electrolyte level in each cell reaches the predetermined set point.

Figure 8:
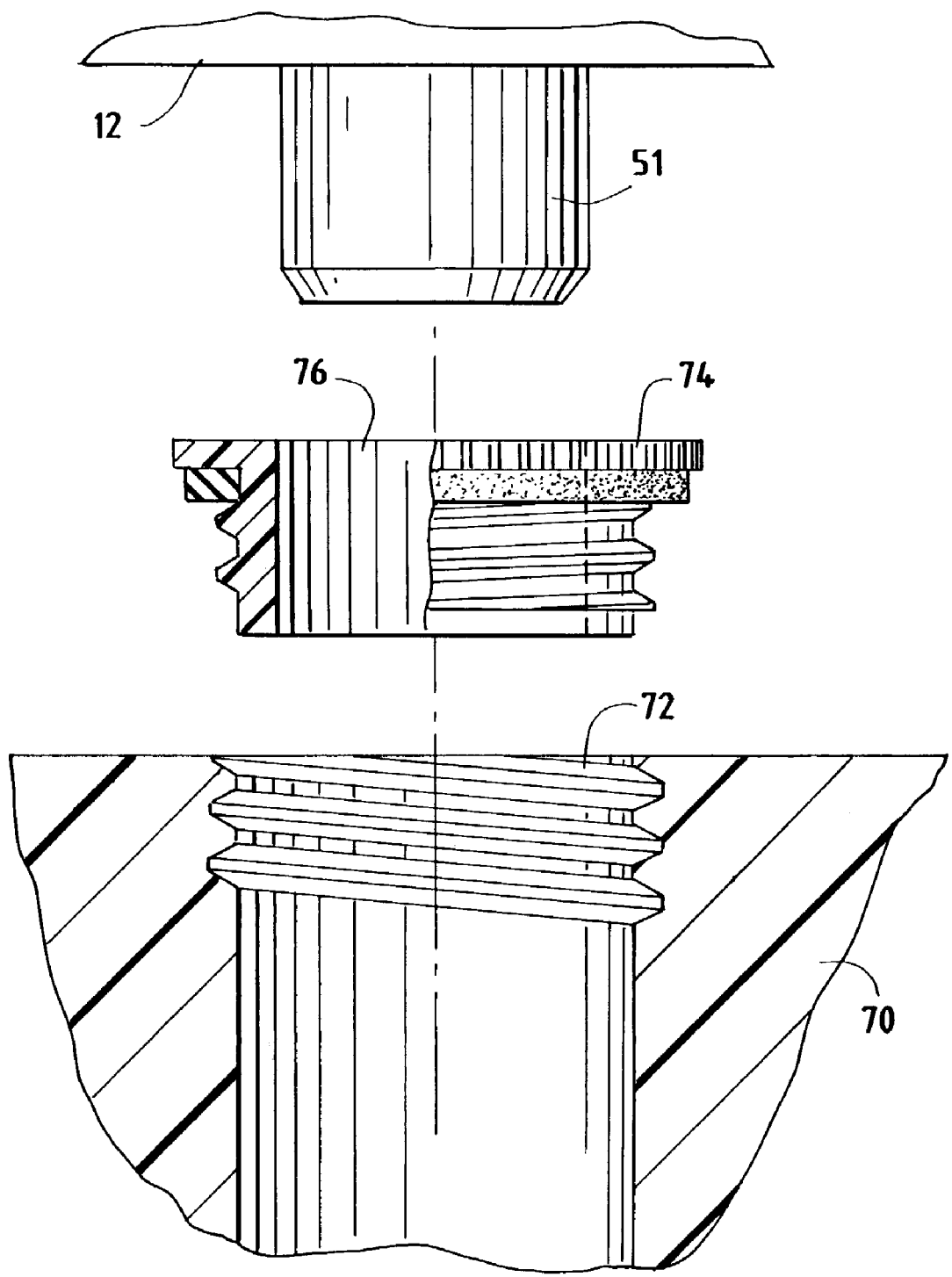
FIG. 8 is an enlarged and exploded side view, in partial cross section, showing use of a special adaption in accordance with a preferred embodiment of the invention.

FIG. 8 illustrates one other version of deep cycle battery 70 having a threaded vent port opening 72. When used with this form of deep cycle battery an externally threaded adaptor 74 is first assembled to the vent port opening. Adaptor 74 has a smooth cylindrical internal surface 76 which cooperates with the manifold skirt 51 to provide a press fit, leak tight seal between the manifold assembly 12 and the battery.

It will be appreciated by those skilled in the art that various changes and modifications can be made to the illustrated embodiments without departing from the spirit of the present invention. All such modifications and changes are intended to be covered by the appended claims.

I claim:

1. A single point watering system for use with a lead-acid battery having a plurality of battery cell access ports, the system comprising:
   a plurality of refill valves;
   a manifold having (i) an elongated water feed tube with at least one external port and a plurality of outlets positioned at intermediate locations along its length each communicating with one of the plurality of refill valves, and (ii) at least one passageway housing a flame arrestor to permit the discharge of gases from the battery cells to the surrounding environment only through the flame arrestor;
   said manifold also having a plurality of cylindrical enclosures each configured to receive one of said refill valves such that each refill valve inlet is in sealed relationship with one of the feed tube outlets, and said at least one gas discharge passageway in fluid communication with adjacent enclosures; and
   said manifold being removably and sealably mountable to said battery so that each refill valve is in fluid communication with one of the battery cell access ports.

2. The single point watering system of claim 1 wherein said feed tube has opposing ends with one external port located at one end and two external ports located intermediate said ends.

3. The single point watering system of claim 1 wherein each of said refill valves includes a valve body and an acuator, the valve body of each valve being housed within one of the manifold enclosures and the acuator of each valve extending from the manifold into one of said battery cell access ports.

4. The single point watering system of claim 1 wherein said water feed tube has an external port at each of its ends and two external ports intermediate its ends.

5. The single point watering system of claim 1 wherein two manifolds are sealably mounted to said battery and are connected so that the feed tube of each manifold is in fluid communication with the other.

6. The single point watering system of claim 1 wherein said manifold comprises a base and a cover which are sealably joined and cooperate to form said enclosures for each valve body, and the gas discharge passageway is located between adjacent enclosures.

7. The single point watering system of claim 6 wherein the base includes a baffle positioned between adjacent enclosures to substantially isolate the water and electrolyte for one cell from that of an adjacent cell.

8. The single point watering system of claim 7 wherein said manifold base includes sloping surfaces to direct water and electrolyte from the gas discharge passageway into the battery cells.

9. The single point watering system of claim 1 wherein said lead-acid battery is a marine deep cycle battery.

10. The single point watering system of claim 1 wherein the battery has threaded access ports and said system further comprises an externally threaded adaptor which mates with the battery access port and cooperates with said manifold to removably and sealably mount the manifold to the battery.

11. The single point watering system of claim 1 wherein said manifold houses three refill valves.

* * * * *